US012571629B2

(12) United States Patent

Sudie

(10) Patent No.: US 12,571,629 B2

(45) Date of Patent: Mar. 10, 2026

(54) DISTANCE MEASURING ASSEMBLY

(71) Applicant: Kevin Sudie, Chicago, IL (US)

(72) Inventor: Kevin Sudie, Chicago, IL (US)

(73) Assignee: Kevin Sudie

( * ) Notice: Subject to any disclaimer, the term of this patent is extended or adjusted under 35 U.S.C. 154(b) by 130 days.

(21) Appl. No.: 18/545,139

(22) Filed: Dec. 19, 2023

(65) Prior Publication Data

US 2025/0198753 A1    Jun. 19, 2025

(51) Int. Cl.
G01B 11/02        (2006.01)
G01C 3/14          (2006.01)

(52) U.S. Cl.
CPC .............. G01C 3/14 (2013.01); G01B 11/026 (2013.01)

(58) Field of Classification Search
CPC ................................ G01C 3/14; G01B 11/026
See application file for complete search history.

(56) References Cited

U.S. PATENT DOCUMENTS

| | | | |
|---|---|---|---|
| 11,069,082 B1 | 7/2021 | Ebrahimi Afrouzi et al. | |
| 2012/0081519 A1* | 4/2012 | Goma ................... | H04N 13/239 |
| | | | 348/47 |
| 2015/0036886 A1* | 2/2015 | Matono ...................... | G06T 7/70 |
| | | | 382/106 |
| 2018/0024521 A1* | 1/2018 | Matsuura ............... | B25J 9/1692 |
| | | | 700/83 |
| 2020/0023522 A1* | 1/2020 | Suzuki ................... | B25J 9/1697 |
| 2021/0025692 A1* | 1/2021 | Nahum ................ | G01B 11/005 |
| 2024/0183486 A1* | 6/2024 | Luong ................... | H04N 23/695 |
| 2024/0303858 A1* | 9/2024 | Turpin ....................... | G06T 7/13 |

* cited by examiner

*Primary Examiner* — Jonathan M Hansen
(74) *Attorney, Agent, or Firm* — James D Palmatier; Applied Patent Services

(57)        ABSTRACT

The distance measuring assembly is a two camera system featuring three axis controls connected such that a first camera has pan and tilt control and the second camera shares the pan and tilt of the first camera and further has an independent pan or tilt. The second camera is attached to the first camera by a dogleg servo horn providing an offset to align the optical axis of the first and second camera. The assembly is adapted to find a target object by locating it and aligning an optical axis of each camera with the target object, and using the angular offset calculated by the axis controllers to triangulate the position of the target object.

14 Claims, 3 Drawing Sheets

DISTANCE MEASURING ASSEMBLY

FIELD OF THE INVENTION

The present invention relates generally to a Stereo camera assembly for measuring a distance to an object.

BACKGROUND OF THE INVENTION

Autonomous devices such as robots, fork lifts and other vehicles need to measure the distance to objects along a proposed path. Such objects may be obstacles or destinations and measuring the distance to the object is important to avoid collisions, effectively move about a workspace and reach a destination. Distance measuring devices are known using sonar, radar, lasers and cameras. An assembly of multiple cameras has been used to recognize an object and triangulate its distance from the assembly. Previous attempts to measure distance with a multiple camera setup include US Pat Application 20150036886 for Distance Calculator and Distance Calculation to Matono et. A1 which allegedly discloses the use of a stereo camera setup for measuring distance using a blurriness measure or a triangulation technique to analyze images captured by a one or more cameras. Likewise, U.S. Pat. No. 11,069,082 B1 for Remote Distance Estimation System And Method to Afrouzi et. al allegedly discloses use of multiple camera systems and a laser source mounted on a robot to determine distance and further discusses angular calculation of distance from the camera.

Such prior art devices are software-intensive and expensive to build requiring multiple pan-tilt setups. Some require each camera to comprise a pan-tilt setup which use 2 servo motors each, and both pan-tilt setups may need another servo to rotate both camera setups for a total of 5 motors.

It is desired to provide a binocular camera system having a plurality of axis around which the cameras may be adjusted to center an image of an object to calculate the distance to the object by triangulating the focus of each camera on a target object. In addition, the assembly may allow 360 degree stereo vision distance measurement. It is the goal of the inventor to provide a multi-camera system that is less expensive to build and operate.

BRIEF SUMMARY OF THE INVENTION

The distance measuring assembly of this invention comprises a stereo camera assembly adapted to determine distance from the camera to a target. The stereo camera assembly comprises two cameras on a servo horn with three axis controls. Each axis control may comprise a servo motor, servo controller, and a position sensor measuring angular rotation such as an encoder, Hall effect sensor or potentiometer position sensor. Each servo motor comprising a servo base and a servo shaft. The servo motor connected to the respective servo controller. Each servo shaft disposed on an independent axis and adapted to rotate about the respective independent axis. The position sensor adapted to measure the angular position of the servo shaft about the respective axis. Each servo controller connected to the respective servo motor and position sensor for closed loop control of the rotation about the respective axis as is known in servo control applications.

The distance measuring assembly comprises three axis controls. For purpose of description the three axis controllers are referred to as pan control 1, tilt control 1 and pan control 2. The servo horn may comprise a first servo horn end, a second servo horn end and an offset portion. The assembly may comprise a pan control 1 on an assembly base. First servo shaft, of pan control 1, is disposed on and is adapted to rotate about first y axis to urge a panning motion, from side to side, to the attached components. Tilt control 1 may be disposed on first servo shaft having second servo shaft disposed on first x axis. First y axis may be generally perpendicular to first x axis. Servo horn may be disposed on and extending from second servo shaft having first servo horn end and second servo end disposed on first x axis. Second servo control may be adapted to rotate servo horn about first x axis to urge a tilting motion, up and down, to attached components. Pan control 2 may be disposed on second servo horn end having third servo shaft disposed on second y axis. Second y axis may be generally parallel and spaced from first y axis. Second camera may be disposed on third servo shaft whereby pan control 2 is adapted to urge second camera in a panning motion.

The first camera is panned about first y axis by pan control land tilted about first x axis by tilt control 1. Second camera is panned by pan control 1 and tilted by tilt control 1. Second camera may also be panned by pan control 2, independent of pan control 1. The assembly allows first and second camera to share pan orientation by pan control 1 and tilt orientation by tilt control 1. Further, second camera may be panned independently by pan control 2.

A control box may be mounted on the first servo shaft between first servo motor and pan control 1. The control box may include a power supply connected to each axis control and the image processor. Each of the three servo controllers may be disposed in the control box. An image processor may also be disposed in the control box. The image processor may be attached to each of the three servo controllers and the respective position sensors. The image processor is adapted to identify a target in the camera's field of view. The image processor further is adapted to locate the target with respect to the center of the camera's field of view and develop an error measurement relative to the angular distance between the target and the center of the camera's field of view. The image processor is adapted to command each of the respective axis controllers to move the first and second cameras in a pan and/or tilt motion to reduce the error and orient each camera in a position wherein the target is centered in the both camera's field of view. The image processor is adapted to read the angular displacement of each camera and using a triangulation routine, to calculate the distance to the target from the camera.

The first camera shares the pan control 1 and tilt control 2 with second camera. Further, the second camera also has its own pan control 2 (second y axis). Each camera has a lens defining a field of view comprising a cone shaped area perpendicular to the lens. The center of the field of view is defined by an optical axis extending perpendicular from the lens. When the target is aligned with the optical axis the target is 'centered' in the field of view. The first camera optical axis is perpendicular to the first x axis. The optical axis has a base at the camera and extends from the camera through the lens to infinity. The distance between the first camera and the second camera is a constant. The angle of the optical axis of the first camera to the target is 90 degrees. The measured angle of the optical axis from first x axis to the target is measured by second servo position sensor. The distance from the first x axis to the target is calculated by the image processor by multiplying the tangent of the second camera's angular deflection relative to the first x axis by the fixed distance between the two cameras.

The above description sets forth, rather broadly, the more important features of the present invention so that the detailed description of the preferred embodiment that follows may be better understood and contributions of the present invention to the art may be better appreciated. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DETAILED DESCRIPTION OF THE INVENTION

Figures 1, 2, 3:
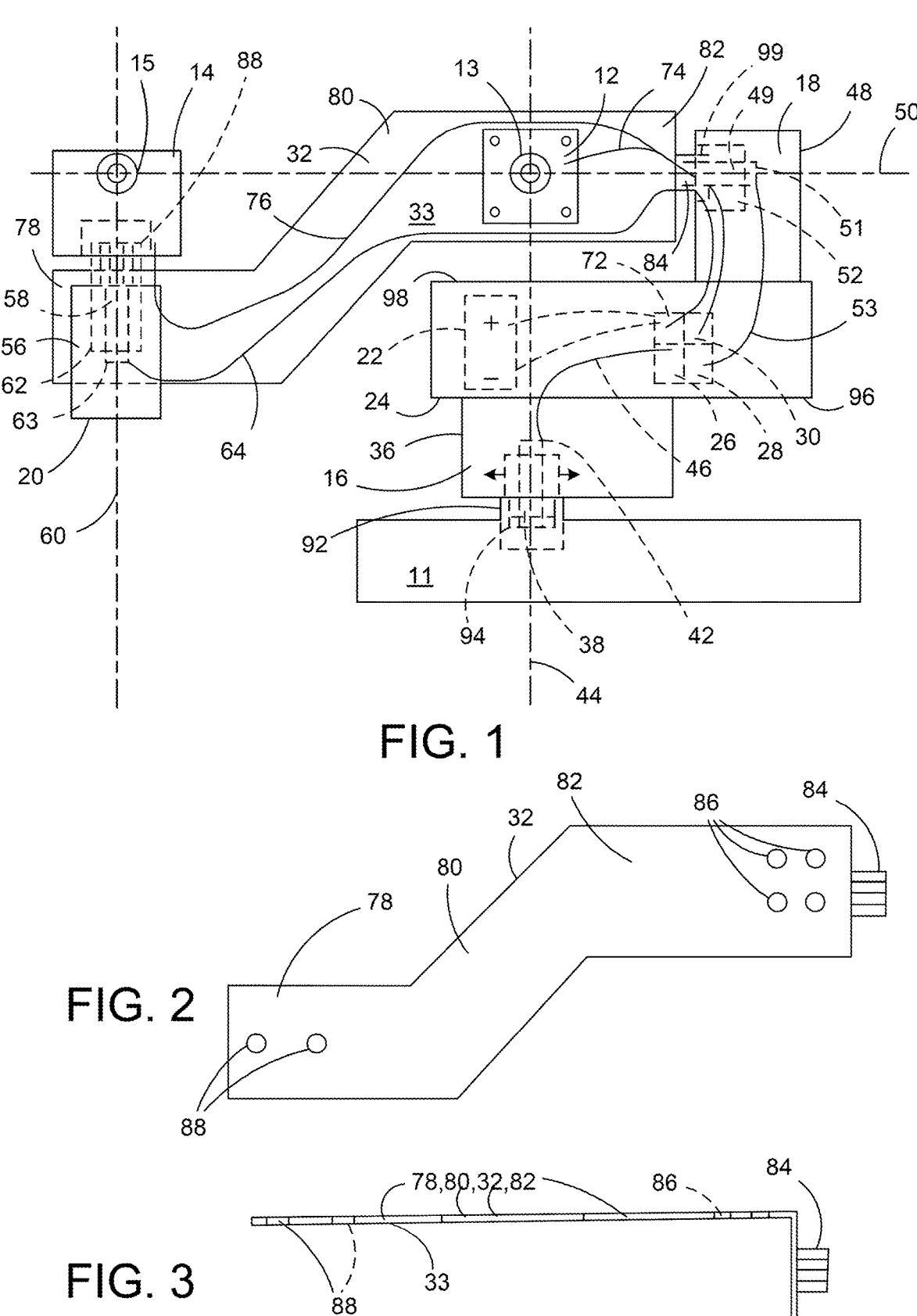
FIG. 1 Is a front elevation view of the distance measuring assembly.
FIG. 2 is a front elevation view of the dogleg servo horn.
FIG. 3 is a top plan view of the dogleg servo horn of FIG. 2.

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention. (It is to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting.) It should be appreciated that the invention can be used for any suitable device attachable to a magnetic surface, Referring to FIG. 1, the distance measuring assembly 10 may comprise platform 11, first camera 12, second camera 14, first axis control 16, second axis control 18, third axis control 20, power supply 22, control box 24, and dogleg servo horn 32. Generally, each servo motor 36, 48, 56 may be sourced as a Adafruit Batam S1123 or B2122 or Parallax Feedback 360 Degree high-speed continuous rotation servo. Each axis control 16, 18, 20 may have separate servo controller 26, 28, 30 to control the orientation of the respective servo shaft 40, 49, 58 about a respective axis 44, 50, 60. First servo controller 26 may be in control box 24 and connected to first servo motor 42 and first position sensor 42 by first connector 46. Second motor control 28 is in control box 24 and connected to second servo motor 18 and second position sensor 51 by second connector 53. Third servo controller 30 is in control box 24 and connected to third servo motor 20 and third position sensor 63 by third connector 64. The servo motors 36, 48, 56 may be adapted to rotate the respective servo shaft 38, 49, 58 about a respective axis 44, 50, 60 to an angular displacement position with respect to a predefined zero. The angular position of the respective servo shaft 38, 49 58 is measured by the attached, respective position sensor 42, 51, 63.

Continuing to refer to FIG. 1, first axis control 16 may comprise first servo motor 36, first servo controller 26, first servo shaft 38, and first position sensor 42. First servo shaft 38 is part of first servo motor 36. First position sensor 26 is on first servo shaft 38 and connected to first servo controller 26. First servo shaft 38 may be disposed on first y axis 44 and in a generally vertical orientation, for purposes of this description, and generally perpendicular to the platform 11. First position sensor 42 may be adapted to measure angular orientation of first servo shaft 38 and communicate angular position of first servo shaft 38 about first y axis 44 to first servo controller 26. First servo motor 36 and first position sensor 42 may be connected to first servo control 26 by connector 46 to communicate power and control commands between first servo motor 36, first position sensor 42 and first servo controller 26. First position sensor 42 is connected to first servo control 26 by connector 46. Connector 46 may be a hardwired or wireless communication such as Bluetooth®. First position sensor 42 may be adapted to measure and communicate angular position of first servo shaft 38 to first servo controller 26.

Continuing to refer to FIG. 1, second axis control 18 may comprise second motor 48, second servo controller 28, second servo shaft 49, and second position sensor 51. Second servo shaft 49 is part of second servo motor 48. Second servo controller 28 is connected to second servo motor 48 and second position sensor 51. Second position sensor 51 is on second servo shaft 49 and connected to second servo controller 28. Second position sensor 51 may be adapted to measure and communicate angular position information of second servo shaft 49 to second servo controller 28. Second servo shaft 49 may be disposed along first x axis 50. First x axis 50 may be generally perpendicular to first y axis 44. Second servo motor 48 and second position sensor 51 may be connected to second servo controller 28 by second connector 53 to urge rotation of second servo shaft 49 about first x axis and communicate angular position of second servo shaft 49.

Likewise, Continuing to refer to FIG. 1, third axis control 20 may comprise third servo motor 56, third servo controller 30, third servo shaft 58 and third position sensor 63. Third servo shaft 58 is part of third servo motor 56. Third servo controller 30 is connected to third servo motor 56 and third position sensor 63. Third position sensor 63 is on third servo shaft 58 and connected to third servo controller 30. Third servo shaft 58 may be disposed along second y axis 60. Second y axis 60 may be generally perpendicular to parallel and spaced from first y axis 44. Third servo motor 56 and third position sensor 63 may be connected to third servo controller 30 by third connector 64 to urge rotation of third servo shaft 58 about second y axis and communicate angular position of third servo shaft 58. Third position sensor 63 may be adapted to measure and communicate angular position information of third servo shaft 58 to third servo controller 30.

Continuing to refer to FIG. 1, each axis control 16, 18, 20 may have separate motor control 26, 28, 30 to control the orientation of the respective shaft 40, 49, 58 about a respective axis 44, 50, 60. First servo control 26 may be in control box 24 and connected to image processor 72, first servo motor 42 and first position sensor 42 by first connector 46. Second motor control 28 is in control box 24 and connected to image processor 72, second servo motor 18 and second position sensor 51 by second connector 53. Third motor control 28 is in control box 24 and connected to image processor 72, third servo motor 20 and third position sensor 63 by third connector 64. Image processor 72 may be in control box 24 and may be connected to first camera 12 by fourth connector 74 and to second camera 14 by fifth connector 76. Image processor 72 may be connected to first and second camera 12, 14 to receive image data from the cameras. Image processor 72 may be a NVIDIA Jetson Nano type system. Each of the first and second cameras 12, 14 may be a Rasberry Pi camera module 2 or equivalent.

Continuing to refer to FIG. 1, power supply 22 may comprise a battery 100 or a power inverter, disposed in control box 24. Power supply 22 is connected image processing module 72 to provide power to first and second cameras 12, 14. Power supply 22 is also connected to connected to servo controllers 26, 28, 30 to provide power to first, second and third servo motors 36, 48, 56.

Continuing to refer to FIG. 1, first motor 16 is adapted to rotate first servo shaft 38 thereby moving the control box 24 about first axis 44. First servo motor 36 is attached between platform 11 and control box 24 by first servo shaft 38 extending from first servo motor 36 being attached to platform 11. First servo motor 36 may be disposed on control box 24 thereby supporting control box 24 in spaced relation to platform 11. First servo shaft 38 may further comprise first spline 92 adapted to engage platform 11 at platform socket 94. First servo motor 36 drives first shaft 38 about first y axis 44 thereby rotating control box 24 about first y axis 44. Control box 24 may comprise bottom surface 96 and top surface 98. Bottom surface 96 may be on first servo motor 36. Control box 24 may be mounted in spaced relation to platform 11 having first servo motor 36 between platform 11 and control box 24. Second servo motor 49 may be mounted on control box 24 having second servo shaft 49 disposed along first x axis 50. Second servo shaft 49 may be adapted to rotate about first x axis. Dogleg servo horn 32 may be attached to second servo shaft 49 at second socket 99.

Continuing to refer to FIG. 1, second camera 14 may be mounted on dogleg servo horn 32 in spaced relation to first camera 12. Second camera may be adapted to move second camera 14 in a pan movement, side to side, about second y axis 60. Third shaft 58 may further comprise third spline 88 adapted to attach to second camera 14. Third shaft 58 may be rotated by third servo motor 56 to an angular orientation measured by third position sensor 63. It should be understood, first, second and third position sensors 42, 51, 63 may be adapted to measure angular displacement about the respective axis' 44, 50, 60 and communicate the angular displacement to the respective servo controller 26, 28, 30 and image processor 72. Camera 2 may be disposed on second shaft 58. First camera 12 may comprise a first lens 13. Second camera 14 may further comprise a second lens 15.

Referring to FIGS. 1, 2 and 3, dogleg servo horn 32 may comprise a front side 33, a first horn end 78, an offset portion 80 and a motor mount end 82. Motor mount end 82 may comprise horn spline 84 adapted to connect to second servo shaft 49. First camera mounting holes 86 may be formed between motor mount end 82 and dogleg offset portion 80. Second camera mount holes 88 may be formed on servo horn 32 between offset portion 80 and first horn end 78. Dogleg offset portion 80 may be adapted to dispose first and second cameras 12, 14 on first x axis 50. Servo horn 32 connects second motor 18 to third motor 20. Third motor 20 on servo horn 32 is mounted between servo horn 32 and second camera 14. Dogleg offset portion 80 is adapted to horizontally align the first camera 12 and second camera 14 generally along first x axis 50. That is, in order for second camera 14 to be the same height as first camera 12, the height of second camera 14 on third motor 20 must be offset by the dogleg portion 80.

Figure 4:
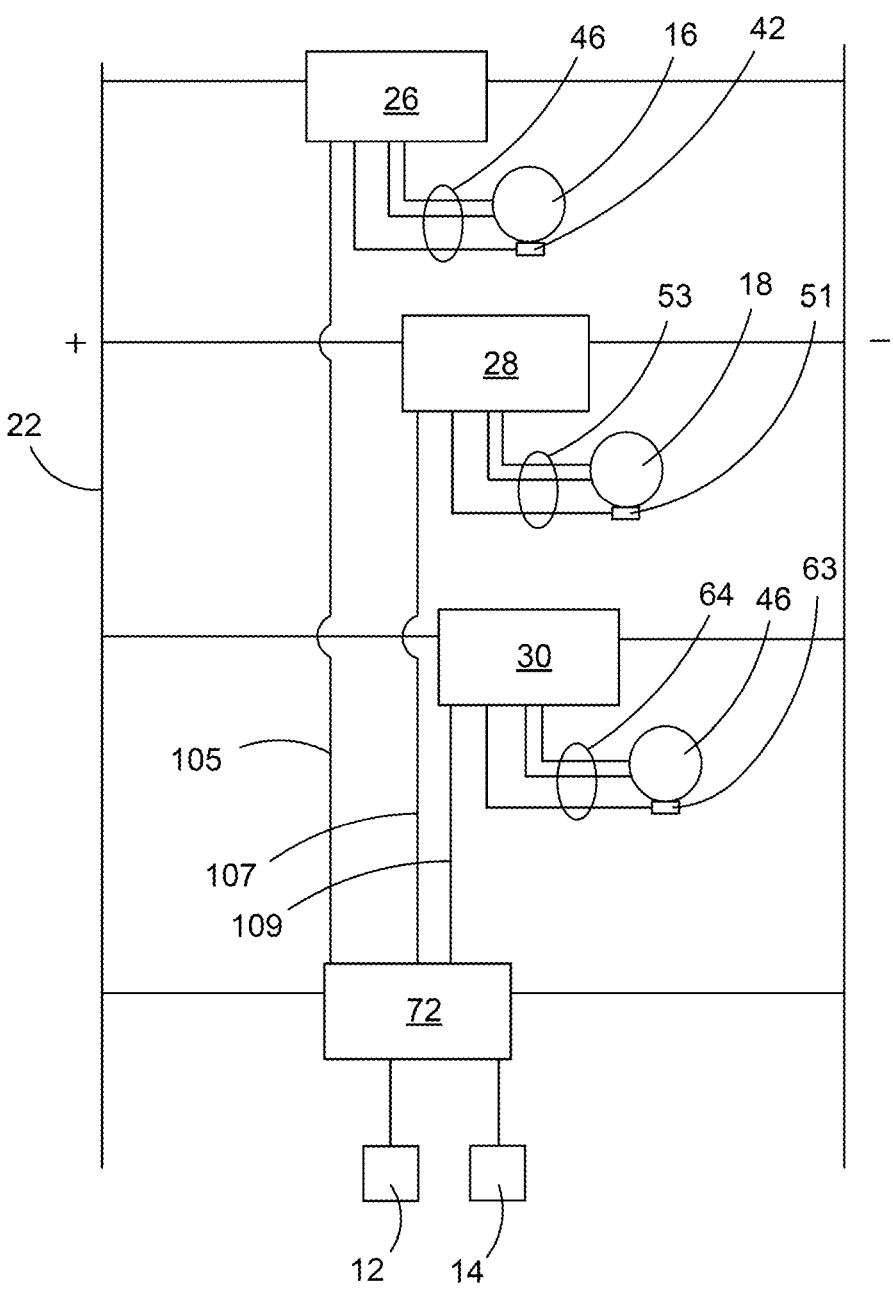
FIG. 4 is connection diagram of the distance measuring assembly.

Referring to FIG. 4, the first axis control 16 may be connected by connector 46 to first servo controller 26 to urge rotation of first servo shaft 38 and transmit rotational position measured by first position sensor 42. First servo control 26, second servo control 28 and third servo control 30 are each separately connected to image processing module by connectors 105, 107 and 109 respectively. Likewise, second axis control 18 may be connected by connector 53 to second servo control 28. Third axis control 20 may be connected to third motor control by connector 64. Connectors 105, 107 and 109 may be wire, fiber optic cable or Bluetooth®. Each axis control 26, 28 30 may be attached to power supply 22. The image processor 72 may be connected to power supply 22 and first and second camera 12, 14. Image processing module 72 may also be connected to each camera 12, 14 to receive image data captured by cameras 12, 14.

Figure 5:
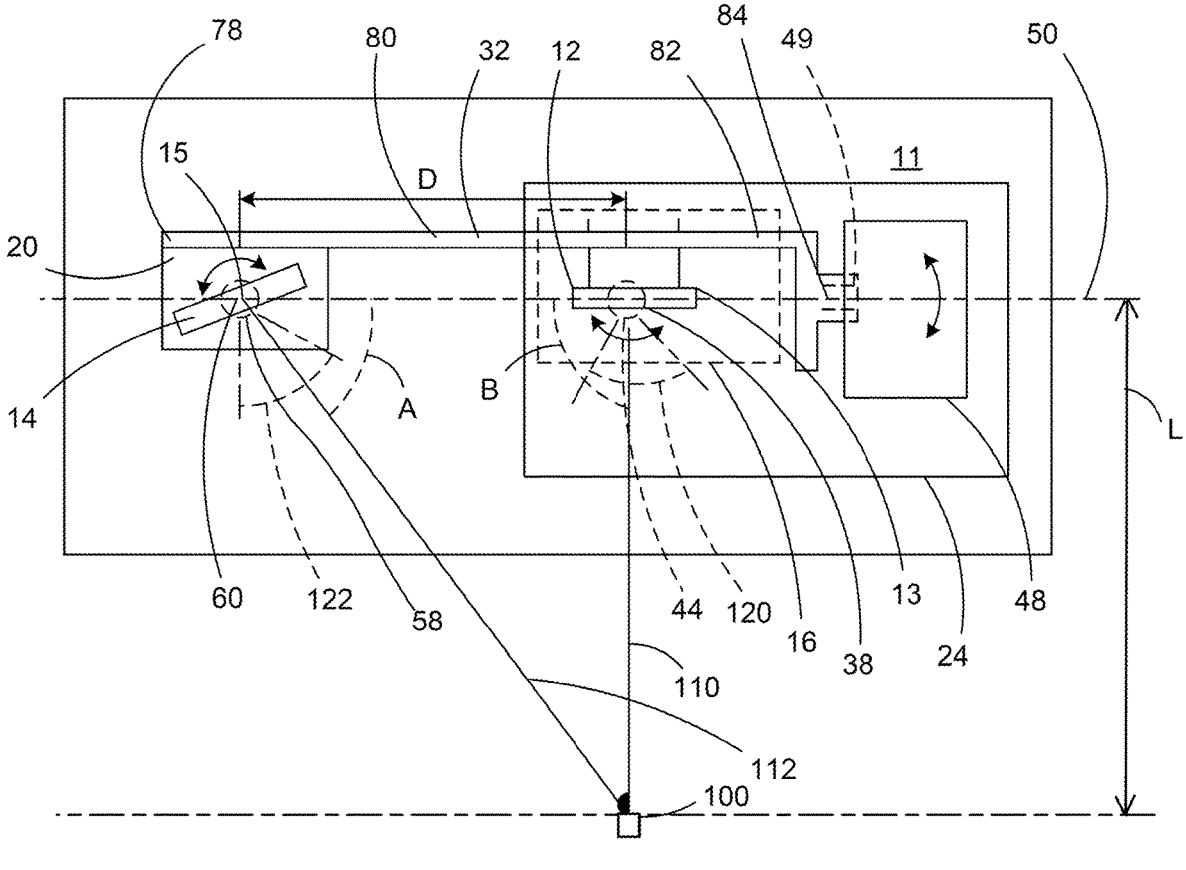
FIG. 5 is a top plan view of the distance measuring assembly.

Referring to FIG. 5, first servo shaft 38 may support and rotate control box 24. Second servo motor 48 may be mounted on control box 24. Servo horn 32 may be mounted on second servo shaft 49 having motor mount end disposed on first x axis. Servo horn 32 rotates with second servo shaft 49. First camera 12 may be mounted on servo horn 32 between offset portion 80 and motor mount end 82. Third motor 20 may be mounted on servo horn 32 in spaced relation to first camera 12 having offset portion 80 there between. The first optical axis 110, representing a sight line extending perpendicular from the first camera 12 at a center point of first lens 13. Image processor may issue commands to first axis control 16 and second axis control 18 to locate the target 100 in first field of view 120 and further center the target 100 by aligning target 100 with first optical axis 110. First optical axis 110 may be orientated generally perpendicular to servo horn 32 at fixed angle B, preferable 90 degrees. Second camera 14 may be disposed on third servo shaft 58 at distance D from first optical axis 110. Distance D is measured along first x axis 50 from the intersection of first optical axis 110 and first x axis 50 to the intersection of second optical axis 112 and first x axis 50. The second optical axis 112 on second camera 14 may be disposed at the center point of second lens 15 and define the center of the second field of view 122. Second optical axis 112 may be disposed generally perpendicular to second lens 15. Second optical axis 112 may be disposed at a calculated, variable angle A from first x axis 50. Second optical axis 112 may be adjusted to an angular orientation determined by image processor 72 to intersect first optical axis 110 at target point 100. The angular displacement A of the second optical axis 112 to first x axis 50 may be changed by third axis control 20 pivoting second camera 20 about second y axis 60. Angle A may be measured by third position sensor 63 and communicated to optical processing module 72 (FIGS. 1 and 4). First motor 16 may be disposed on first y axis 44. first optical axis may be disposed at the intersection of first y axis 44 and first x axis 50.

Referring to FIGS. 1-5, in operation, image processor 72 sends control signals to first servo controller 26 and second servo controller 28 to orient first camera 12 having target 100 on first optical axis 110. Image processor 72 further transmits control signals to third axis control 14 to rotate third shaft 58 to align target 100 with second optical axis 112. Target 100 may be aligned with first and second optical axis' 110, 112 by image centering software tools well known in open-source contour detection and camera center positioning algorithms such as available at www.OPENCV.org. Third position sensor 63 may transmit the angular measurement A to optical processing module 72. Image processor 72 calculates the distance X from first camera 12 to the target 100 by the use of Pythagorean Theorem, whereby the distance L to the target 100 from the intersection of the first x axis 50 and the first optical X is equal to the distance D between first camera 12 and second camera 14 multiplied by the tangent of angle A (L=D×Tan A).

The distance measuring assembly as described in FIGS. 1-5 whereby the following steps are used to calculate a distance to a target.

1. Receiving a first image from the first camera in the image processor;
2. Receiving a second image from the second camera in the image processor;
3. Analyzing the first image received from the first camera to identify a target in the first image;
4. Analyzing the second image received from the second camera to identify the target in the second image;
5. Engaging the image centering function to calculate a first pan error and a first tilt error, relative to the distance between the first optical axis and the target in the first image;
6. Translate the first pan error to a calculated first angular pan translation of the first servo shaft;
7. Communicate the first angular pan translation to the first axis control whereby the first servo controller urges the first servo motor to rotate the first servo shaft about the first y axis there by panning the first camera to a first pan error position;
8. Translate the first tilt error to a calculated first angular tilt translation of the second servo shaft;
9. Communicate the first angular tilt translation to the second servo controller whereby the second servo controller urges the second servo motor to rotate the second servo shaft about the first x axis thereby tilting the first camera to a first tilt error position;
10. Engaging the image centering function to calculate a second pan error and a second tilt error, relative to the distance between the second optical axis and the target in the second image;
11. Translate the second pan error to a calculated second angular pan translation of the third servo shaft;
12. Communicate the second angular pan translation to the third axis control whereby the third servo controller urges the third servo motor to rotate the third servo shaft about the second y axis there by panning the second camera to a second pan error position;
13. Translate the second tilt error to a calculated second angular tilt translation of the second servo shaft;
14. Communicate the second angular tilt translation to the second servo controller whereby the second servo controller urges the second servo motor to rotate the second servo shaft about the first x axis thereby tilting the second camera to a second tilt error position;
15. Repeat steps 1-14 until the target is centered on the first optical axis in the first field of view and on the second optical axis in the second field of view;
16. Receive the angular position A of the third position sensor 63;
17. Use a calculation function in the image processor to calculate the distance L from the first x axis 50 to the target 100 by the Pythagorean Theorem with a known distance D between cameras 12, 14 and known angle of 90 degrees between the first optical axis 110 and the first x axis 50.

Although the description above contains many specifications, these should not be construed as limiting the scope of the invention but as merely providing illustrations of some of the embodiments of this invention. Thus, the scope of the invention should be determined by the appended claims and their legal equivalents rather than by the examples given. Further, the present invention has been shown and described with reference to the foregoing exemplary embodiments. It is to be understood, however, that other forms, details, and embodiments may be made without departing from the spirit and scope of the invention which is defined in the following claims.

I claim:

1. A distance measuring assembly comprising:

a platform a first axis control on the platform, the first axis control comprising a first servo motor, and a first servo controller, the first servo motor on the platform, the first servo motor comprising a first servo shaft and a first position sensor, the first servo shaft disposed along a first y axis, the first servo motor adapted to rotate the first servo shaft about the first y axis, the first position sensor on the first servo shaft, the first position sensor adapted to measure the angular position of the first servo shaft, the first servo motor and first position sensor connected to the first servo controller, whereby the first servo motor urges the first servo shaft to rotate about the first y axis to an angular position measured by the first position sensor;

a second axis control, the second axis control comprising a second servo motor, and a second servo controller, the second servo motor on the first servo shaft, the second servo motor comprising a second servo shaft and a second position sensor, the second servo shaft disposed along a first x axis, the first x axis generally perpendicular to the first y axis, the second servo motor adapted to rotate the second servo shaft about the first x axis, the second position sensor on the second servo shaft, the second position sensor adapted to measure the angular position of the second servo shaft, the second servo motor and second position sensor connected to the second servo controller, whereby the second servo motor urges the second servo shaft to rotate about the first x axis to an angular position measured by the second position sensor;

a dogleg servo horn, the dogleg servo horn comprising a front side, a first horn end, an offset portion and a motor mount end, the motor mount end on the second servo shaft whereby the motor mount end is disposed along first x axis, the second servo shaft adapted to rotate the dogleg servo horn about the first x axis a third axis control, the third axis control comprising a third servo motor, and a third servo controller, the third servo motor on the front side of the dogleg servo horn between the first horn end and the offset portion, the third servo motor comprising a third servo shaft and a third position sensor, the third servo shaft disposed along a second y axis, the second y axis generally parallel and spaced from the first y axis, the third servo motor adapted to rotate the third servo shaft about the second y axis, the third position sensor on the third servo shaft, the third position sensor adapted to measure the angular position of the third servo shaft, the third servo motor and third position sensor connected to the third servo controller, whereby the third servo motor urges the third servo shaft to rotate about the second y axis to an angular position measured by the third position sensor;

a first camera on the front side of the dogleg servo horn between the motor mount end and the offset portion, the first camera comprising a first lens defining a first field of view and a first optical axis, the first optical axis disposed generally perpendicular to the first x axis, whereby the first servo shaft adapted to move the first optical axis in a panning motion, the second servo shaft adapted to move the first optical axis in a tilting motion;

a second camera on the third shaft, the second camera comprising a second lens defining a second field of view and a second optical axis, the second optical axis disposed generally perpendicular to the second y axis, the first axis control adapted to move the second optical axis in a panning motion by rotating the first servo shaft about the first y axis, the second axis control adapted to move the second optical axis in a tilting motion by rotating the second servo shaft about the first x axis, the third axis control adapted to move the second optical axis in a secondary panning motion by rotating the third servo shaft about the second y axis independent of the first shaft; and an image processor, the image processor connected to the first camera, the second camera, the first axis control, the second axis control and the third axis control.

2. The distance measuring assembly of claim 1, further comprising a power supply connected to the image processor, the first camera, the second camera, the first axis control, the second axis control and the third axis control.

3. The distance measuring assembly of claim 1, wherein the second optical axis is perpendicular to the first x axis.

4. The distance measuring assembly of claim 1, wherein the first camera lens and the second camera lens are tilted about the first x axis.

5. The distance measuring assembly of claim 1, wherein the first x axis is generally perpendicular to the second y axis.

6. The distance measuring assembly of claim 1, further comprising a calculation function in the image processor.

7. The distance measuring assembly of claim 1, further comprising an image centering function in the image processor.

8. The distance measuring assembly of claim 7, further comprising a calculation function in the image processor.

9. The distance measuring assembly of claim 8, wherein the first camera is spaced from the second camera by a predetermined distance.

10. The distance measuring assembly of claim 9, further comprising a first image containing a target in the first field of view, the first image communicated to the image processor.

11. The distance measuring assembly of claim 10, further comprising an image centering software tool in the image processor, the image centering software adapted to identify the target in the first image, the image centering software further adapted to locate the target image and calculate a first pan error and a first tilt error from the optical axis to the target image, the image processor adapted to communicate the first pan error to the first axis control and the first tilt error to the second axis control.

12. The distance measuring assembly of claim 11, further comprising a second image containing the target in the second field of view, the second image communicated to the image processor.

13. The distance measuring assembly of claim 9, wherein the image centering software is adapted to identify the target in the second image, the image centering software further adapted to locate the target image and calculate a second pan error and a second tilt error from the optical axis to the target image, the image processor adapted to communicate the second pan error to the third axis control and the second tilt error to the second axis control.

14. The distance measuring assembly of claim 13, further comprising a predetermined distance between the first camera and the second camera, the first optical axis disposed at a right angle to the first x axis, whereby the calculating function receives the angular measurement of the third position sensor to calculate the distance from the first x axis to the target.

* * * * *